United States Patent

Comer, Jr.

[15] 3,707,200
[45] Dec. 26, 1972

[54] DUAL METER UNIT STEERING CONTROL
[72] Inventor: Glen S. Comer, Jr., Peoria, Ill.
[73] Assignee: Caterpillar Tractor Co., Peoria, Ill.
[22] Filed: Dec. 28, 1970
[21] Appl. No.: 101,989

[52] U.S. Cl. .............................. 180/79.2 R, 60/52 S
[51] Int. Cl. ................................................ B62d 5/06
[58] Field of Search ........ 180/79.2 R, 79.2 B, 79.2 C; 60/52 S

[56] References Cited

UNITED STATES PATENTS 3,482,398  12/1969  Christensen ........................... 60/52 S
3,059,717  10/1962  Moyer et al ...................... 180/79.2 R Primary Examiner—Kenneth H. Betts
Assistant Examiner—John A. Pekar
Attorney—Fryer, Tjensvold, Feix, Phillips & Lempio

[57] ABSTRACT

A hydraulic power steering control wherein a second fluid meter unit shaft driven from a first fluid meter unit is employed to add to the fluid displacement of the first unit used to control the volume of fluid delivered from a pump to the control valve of a power steering unit during normal power steering operation. Means are provided to render the second meter unit inoperative in response to pump failure such that the relatively small displacement of the first meter unit alone provides a more favorable mechanical advantage for manual steering of a vehicle in an emergency condition.

3 Claims, 3 Drawing Figures

PATENTED DEC 26 1972
3,707,200
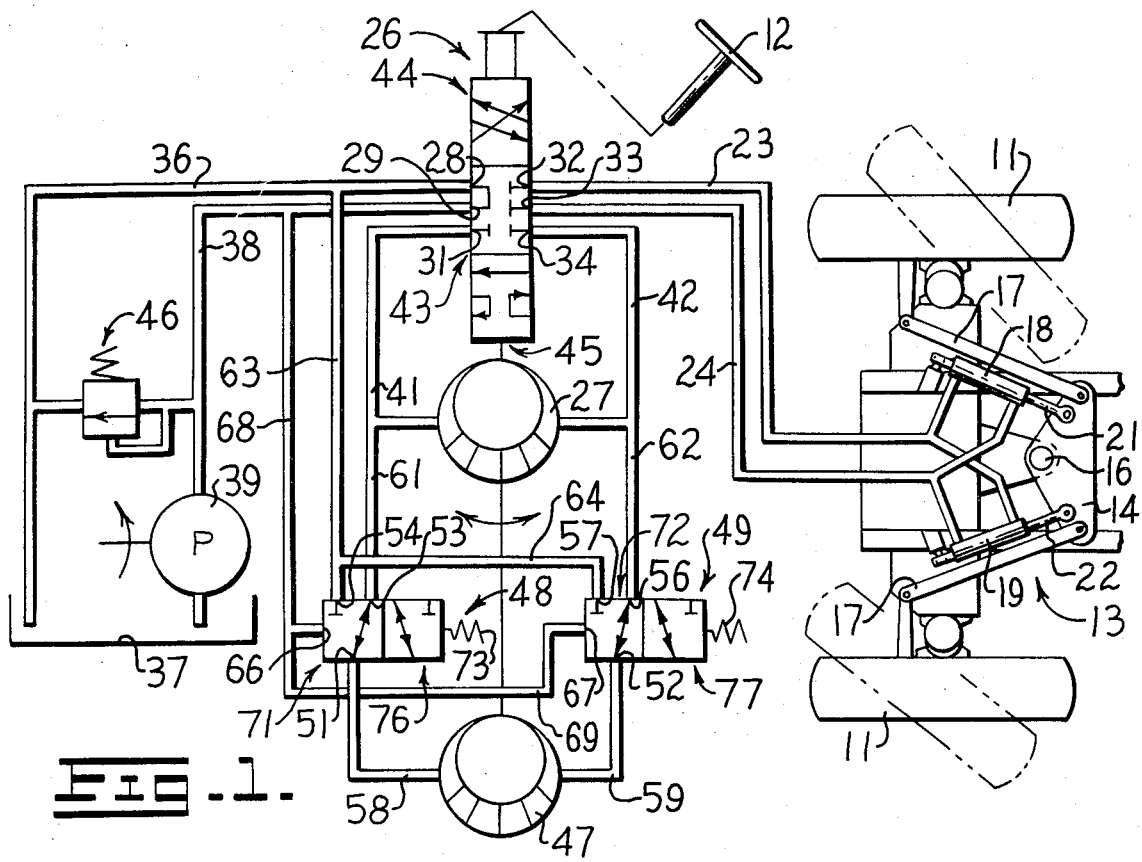
Fig. 1.
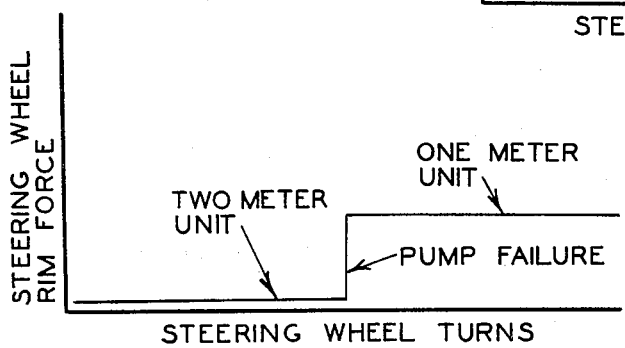
Fig. 2.
Fig. 3.
INVENTOR
GLEN S. COMER, JR.
BY
Myer, Tinnald, Feix, Phillips & Lempio
ATTORNEYS

DUAL METER UNIT STEERING CONTROL

BACKGROUND OF THE INVENTION

In various conventional hydraulic power steering units, a fluid meter unit controls the volume of fluid delivered from an engine driven pump across a steering control valve in accordance with the rotational position of a steering wheel. Upon pump failure due, for example, to engine shut off, the meter unit automatically reverts to a manual steering control by becoming a rotary hand pump which directs fluid to move the vehicle wheel actuator in either direction when the steering wheel is manually rotated.

However, in relatively large power steering control units as are employed on heavy duty earthmoving vehicles and the like, it is difficult, if not impossible, to actuate the steering wheel manually to allow the metering section of the control to function as a rotary hand pump by virtue of the relatively large fluid displacement of the single meter unit.

In other words, the meter unit is so large that extremely high steering wheel force is required to displace fluid for steering; i.e., the substantial displacement of the meter unit is consonant with a low mechanical advantage under manual steering conditions. This creates an extremely dangerous situation because the vehicle cannot be adequately steered when pump failure occurs and an accident sometimes results.

SUMMARY OF THE INVENTION

The present invention relates to an arrangement for reducing the steering effort of a vehicle during engine driven pump pressure failure in an existing hydraulic power steering control of a type having a meter unit for metering fluid displacement from the pump to a control valve, which meter unit functions as a rotary hand pump upon loss of engine driven pump pressure.

In the accomplishment of the foregoing and other advantages and features of the invention, the steering control arrangement of the present invention generally comprises a second meter unit, shaft driven from the first or existing meter unit of the power steering control, the fluid circuits of the two meter units being coupled in parallel between the engine driven pump and control valve of the steering control such that the fluid displacement of the second unit adds to that of the first unit for normal power steering operation when the engine-driven pump is operating.

In other words, for normal operation the fluid delivered to the control valve is determined by the combined displacements of the dual meter units. There are further provided means for rendering the second meter unit inoperative in response to loss of engine-driven pump pressure, which means may comprise pressure sensitive hydraulic valve means between the meter units for shunting fluid displaced by the second unit to the system reservoir when system pressure is lost. As a result, the relatively small displacement of only the first meter unit provides a more favorable mechanical advantage to allow the operator to manually steer the vehicle in an emergency condition.

BRIEF DESCRIPTION OF THE DRAWING

FIG. 1 is a hydraulic circuit diagram of a steering control in accordance with the present invention used in the power steering system of a vehicle.

FIG. 2 is a graph of steering wheel rim force versus steering wheel turns before and after pump failure for a conventional power steering control system having a single meter unit.

FIG. 3 is a graph similar to FIG. 2, but of the system of the present invention having dual meter units.

DETAILED DESCRIPTION OF THE PREFERRED EMBODIMENT OF THE INVENTION

Referring now to FIG. 1 in detail, there is shown a hydraulic power steering system of a vehicle for controlling turning of a pair of steerable vehicle wheels 11 in response to rotation of a steering wheel 12. A conventional steering linkage 13 is associated with the wheels 11 to effect their turning movement, which linkage includes a double ended bellcrank 14 centrally pivoted to the vehicle frame as indicated at 16, and a pair of links 17 respectively connected between the opposite ends of the crank and the opposite wheels. Thus, when the crank is pivoted clockwise, the wheels 11 are turned to the left; when the crank is pivoted counterclockwise the wheels are turned to the right as shown in dashed lines in FIG. 1.

Hydraulically powered pivotal movement of the crank is effected by means of a pair of double acting hydraulic cylinders 18 and 19 having piston equipped plunger rods 21 and 22 mounted for axial reciprocation therein. Cylinders 18 and 19 are secured to the vehicle frame on opposite sides of the crank pivot 16 and the plunger rods 21 and 22 are end connected to opposite ends of the crank. Thus, correlated extension and retraction of rods 21 and 22 respectively effect clockwise pivotal movement of the crank. Conversely, correlated retraction and extension of rods 21 and 22 respectively effect counterclockwise pivotal movement of the crank.

Such hydraulically powered extension and retraction of the rods is controlled by controlling the delivery of hydraulic fluid to and from the opposite ends of the cylinders 18 and 19. More particularly, a conduit 23 is connected to the left end of cylinder 18 and right end of cylinder 19, as viewed in FIG. 1. Similarly, a conduit 24 is connected to the right end of cylinder 18 and left end of cylinder 19. Consequently, when pressurized fluid is delivered to conduit 23 while fluid is bled from conduit 24, rod 21 is extended and rod 22 is retracted to effect turning of the wheels 11 to the left. Delivery of pressurized fluid to conduit 24 while fluid is bled from conduit 23, on the other hand reserves the condition resulting in turning of the wheels to the right.

In order that the foregoing delivery and bleeding of fluid to and from conduits 23 and 24 to the wheels 11 be controlled in response to rotation of the steering wheel 12, there is provided a hydraulic power steering control of generally conventional design. The steering control is of the general variety disclosed in U.S. Pat. No. 2,984,215 to L. L. Charlson. Such control includes a three-way three position steering control valve 26 and associated fluid meter unit 27 both shaft connected to the steering wheel 12 for control in accordance with the rotational position thereof. More particularly, valve 26 includes a first set of ports 28, 29 and 31 and a second set of ports 32, 33 and 34.

Port 28 is connected via a return conduit 36 to a hydraulic fluid reservoir 37 and port 29 is connected via conduit 38 to an engine-driven pump 39 in communication with the reservoir. Ports 32 and 33 of the second set are respectively connected to conduits 23 and 24 leading to the hydraulic cylinders 18 and 19. Ports 31 and 34 are respectively connected by means of conduits 41 and 42 to opposite sides of the meter unit 27.

When the control valve 26 is in a neutral position as indicated at 43, ports 28 and 29 are communicated while all other ports are closed. Fluid delivered by pump 39 to valve 26 is thus returned via conduit 36 to reservoir 37 and no fluid is delivered to the cylinder actuating conduits 23 and 24.

Turning of steering wheel 12 to the left places valve 26 in a left turn position as indicated at 44. In this position, ports 28 and 33 are communicated to connect conduit 24 to return conduit 36. Port 29 is communicated with port 34 and port 31 is communicated with port 32, thereby connecting pump 39 to conduit 23 through meter unit 27. A left turning movement of the wheels 11 is thus effected with the amount of fluid delivered to the hydraulic cylinders 18 and 19 being governed by the meter unit which is controlled in accordance with the extent to which the steering wheel is turned.

In a similar manner, turning of the steering wheel to the right places valve 26 in a right turn position as indicated at 45. Ports 28 and 32 are now communicated to connect conduit 23 to return conduit 36. Port 29 is communicated with port 31 and port 33 is communicated with port 34 whereby pump 39 is connected to conduit 24 through meter unit 27 to effect a right turning movement of the wheels 11.

With a conventional hydraulic power steering control of the type described above, it is to be noted that in the event of pressure failure of pump 39, as may occur for example due to shut off of the engine, the meter unit 27 functions as a hand pump motivated by the turning of the steering wheel 12 to deliver fluid through the control valve 26 to the hydraulic cylinders 18 and 19. The necessary recirculation of fluid through control valve 26 is facilitated by means of a pressure sensitive bypass valve 46 connected between pump conduit 38 and return conduit 36, which valve is actuated for bypass service upon loss of pump pressure. However, where the power steering control is of large size as employed for example in heavy earthmoving vehicles, the displacement of the meter unit is correspondingly large and difficult, if not impossible, to effect manually by turning of the steering wheel. The mechanical advantage accruing from the large displacement of the meter unit is so low that the steering wheel rim force required to effect turning is beyond the capabilities of the average operator.

The foregoing difficulties are obviated in accordance with the present invention by the provision of a second meter unit 47 which is shaft driven from meter unit 27 and arranged to add to the displacement thereof during normal power steering operation. The combined displacement of both units 27 and 47 is now applied to the control valve 26 to effect the hydraulically powered turning of the wheels 11. By virtue of two units combining to provide the overall displacement, the displacement of unit 27 is reduced from what is required where a single unit is employed.

In accordance with the particularly salient aspects of the invention means are provided to disable the second meter unit 47 in response to pressure failure of pump 39. As a result, the meter unit 27 of relatively decreased displacement functions as a hand pump having a more favorable mechanical advantage for effecting turning of the wheels 11 with reduced steering wheel rim force within the capabilities of the operator.

In the accomplishment of the foregoing ends of the present invention, provision is made to selectively connect unit 47 in parallel with unit 27 and to shunt unit 47 to reservoir 37 respectively in response to normal pressure and loss of pressure of pump 39. More particularly, a pair of pressure sensitive valves 48 and 49 are preferably provided respectively having inlet ports 51 and 52 and pairs of outlet ports 53, 54 and 56, 57.

The inlet ports 51 and 52 are connected via conduits 58 and 59 to opposite sides of meter unit 47. Outlet ports 53 and 56 are connected via conduits 61 and 62 to conduits 41 and 42 so as to be paralleled with meter unit 27. Outlet ports 54 and 57 are connected via conduits 63 and 64 to return conduit 36. Valves 48 and 49 further include pressure pilot ports 66 and 67 connected via conduits 68 and 69 to pump conduit 38.

With pump 39 developing pressure under normal operating conditions, the pressure at the pilot ports 66 and 67 causes valves 48 and 49 to assume positions 71 and 72 wherein inlet ports 51 and 52 are communicated with outlet ports 53 and 56, thereby paralleling meter unit 47 with meter unit 27.

Upon a loss of pressure, loading springs 73 and 74 acting in opposition to the pressure at pilot ports 66 and 67 cause the valves to assume positions 76 and 77. In these positions inlet ports 51 and 52 are communicated with outlet ports 54 and 57 to thereby shunt meter unit 47 to reservoir 37 and render such unit inoperative.

With valves 48 and 49 in the normal pressure positions 71 and 72, the displacements of both meter units 27 and 47 are combined in their application to control valve 26 for normal power steering operation in the manner previously described. Upon loss of pump pressure, valves 48 and 49 revert to positions 76 and 77 to thereby shunt the fluid displaced by unit 47 directly to reservoir 37. The displacement fluid from unit 47 is no longer added to the displacement fluid from unit 27 and unit 47 is allowed to turn freely.

The unit 27 now functions as a rotary hand pump in the manner previously described to direct fluid through the control valve 26 for movement of the steering cylinders 18 and 19 in either direction when the steering wheel 12 is manually rotated. With only the displacement of the relatively small meter unit 27, the steering ratio increases and the operator can steer the vehicle which would otherwise be impossible if a single meter unit was employed having a displacement equal to the combined displacements of units 27 and 47.

The advantageous result of two meters is illustrated in FIGS. 2 and 3 which respectively illustrate the increase in steering wheel rim force required upon pump failure for a single meter unit system and for a comparable displacement dual meter unit system in accordance with the present invention. As shown in FIG. 2, the increased force is substantial for a single unit system, whereas from FIG. 3 it is to be noted that the increase in force is substantially reduced by the dual unit system of the present invention.

Although the invention has been hereinbefore described and illustrated in the accompanying drawing with respect to a single preferred embodiment, it will be appreciated that various changes and modifications may be made therein without departing from the true spirit and scope of the invention, and thus it is not intended to limit the invention except by the terms of the appended claims.

What is claimed is:

1. In a hydraulic power steering control system of the type including an engine-driven pump in communication with a fluid reservoir; hydraulic cylinder actuating means for effecting right and left turning movement of vehicle wheels in accordance with the direction of hydraulic fluid flow to and from the actuating means; a steering control valve and associated meter unit shaft connected to a steering wheel; said valve connected by pump and return conduits to said pump and said reservoir; said valve connected by conduits to said actuating means; said valve connected by conduits to said meter unit; said valve having a neutral position wherein said pump and return conduits are communicated, and said conduits to said actuating means and said meter unit are blocked; said valve having a right turn position responsive to turning of said steering wheel to the right wherein said conduits are communicated to deliver fluid from said pump through said meter unit to said actuating means and return fluid therefrom to said reservoir in directions to effect right turning movement of said vehicle wheels by said actuating means in accordance with fluid displacement of said meter unit determined by turning of said steering wheel; said valve having a left turn position responsive to turning of said steering wheel to the left wherein said conduits are communicated to deliver fluid from said pump through said meter unit to said actuating means and return fluid therefrom to said reservoir in directions to effect left turning movement of said vehicle wheels by said actuating means in accordance with fluid displacement of said meter unit determined by turning of said steering wheel; and a pressure sensitive bypass valve connected between said pump and return conduits to communicate same in response to a loss of pressure of said pump whereby said meter unit functions as a rotary hand pump upon failure of said engine-driven pump to deliver fluid to said actuating means in response to turning of said steering wheel; the improvement comprising: a second meter unit shaft driven by said first unit; and means responsive to the pressure of said engine-driven pump for normally fluid coupling said second meter unit in parallel with said first meter unit and disabling said second meter unit in response to a loss of pump pressure.

2. The combination of claim 1, further defined by said means coupling said second meter unit in parallel with said first meter unit and disabling said second meter unit in response to a loss of pressure, comprising: pressure sensitive valve means having a first position connecting said second meter unit in parallel with said first meter unit and a second position shunting said second meter unit to said reservoir; said valve shiftable between said first and second positions thereof in response to a loss of pressure in said pump conduit.

3. The combination of claim 2, further defined by said pressure sensitive valve means comprising: first and second pressure sensitive valves each having an inlet port; first and second outlet ports; and a pressure pilot port; said valves each having spring loading means opposing pressure at said pilot port to shift the valve from a first position to a second position in response to a loss of pressure at said pilot port; each of said valves in said first position communicating said inlet port with said first outlet port thereof, each of said valves in said second position communicating said inlet port with said second outlet port thereof; conduits connecting said inlet ports of said first and second valves to opposite sides of said second meter unit; conduits connecting said first outlet ports of said first and second valves to opposite sides of said first meter unit; conduits connecting said second outlet ports of said first and second valves to said return conduit; and conduits connecting said pilot ports of said first and second valves to said pump conduit.

* * * * *